June 3, 1947.                E. K. CLARK                2,421,538
                        THERMOSTATIC SWITCH
                    Original Filed May 21, 1941
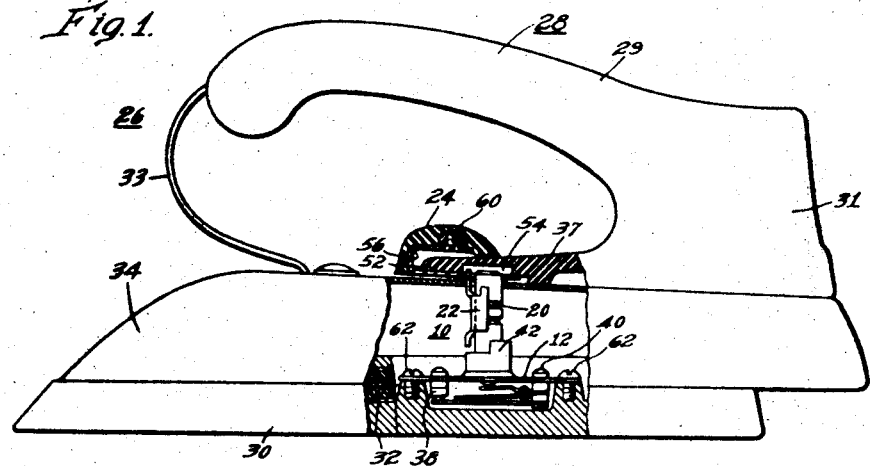
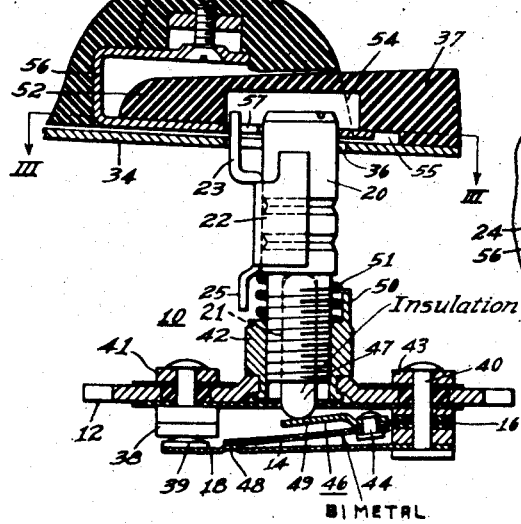
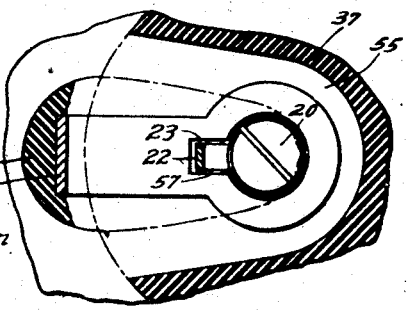
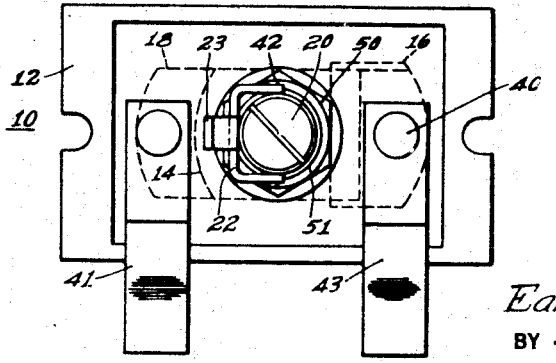
WITNESSES:
INVENTOR
*Earl K. Clark.*
BY
ATTORNEY Patented June 3, 1947

2,421,538

UNITED STATES PATENT OFFICE 2,421,538

THERMOSTATIC SWITCH

Earl K. Clark, Mansfield, Ohio, assignor to Westinghouse Electric Corporation, East Pittsburgh, Pa., a corporation of Pennsylvania Original application May 21, 1941, Serial No. 394,469. Divided and this application January 13, 1945, Serial No. 572,694

2 Claims. (Cl. 200—122)

This application is a division of my application Serial No. 394,469, filed May 21, 1941, now Patent No. 2,370,146, granted February 27, 1945.

My invention relates to a thermostat, and it has for an object to produce a simple construction which may be manufactured at low cost.

This and other objects of my invention will either be pointed out specifically in the course of the following description of a device embodying my invention or will be apparent from such description.

In the accompanying drawing,

Figure 1 is a side elevational view, partly in section, of an iron having the thermostat embodying my invention associated therewith;

Fig. 2 is an enlarged sectional view of the thermostat embodying my invention associated with the control knob;

Fig. 3 is a sectional view taken along the line III—III of Fig. 2; and

Fig. 4 is a top view of the thermostat embodying my invention.

Referring to the accompanying drawing, there is shown a thermostat 10 embodying a supporting structure 12, a bimetallic element 14 insulatedly attached to the supporting structure 12 by means of a resilient member 16, a resilient contact-carrying member 18 and an adjusting screw 20. The adjusting screw 20 has attached thereto a substantially U-shaped bracket 22 which cooperates with a control knob 24, and the control knob 24 is utilized to rotate the adjusting screw to vary the operation of the bimetallic element 14.

The thermostat 10, embodying my invention, is shown as being associated with a sadiron structure 26, embodying a handle 28, a soleplate 30, a heating element 32 and a suitable cover plate 34. However, it is to be understood that the thermostat 10 may be associated with any other suitable structure.

The heating element 32 is, in this instance, positioned upon and attached to the soleplate and supplies heat thereto in a well-known manner. The energization of the heating element 32 is controlled by the thermostat 10 which is connected in series with the heating element in a familiar manner, to maintain a preselected temperature of the soleplate.

The cover plate 34 is positioned upon the soleplate 30 and extends above the heating element 32 and thermostat structure 10. An opening 36 is provided in the cover plate through which the upper end of the adjusting screw 20 and U-shaped bracket 22 of the thermostat 10 extend and in which they may freely rotate.

The handle 28 includes a grip portion 29 retained above the cover plate 34 by a rear portion 31 and a front member 33 which is fastened thereto and rigidly attached to the cover plate 34. A skirt portion 37, integral with the rear portion 31, extends toward the front of the iron just above or in contact with the cover plate 34 and covers the opening 36 therein. An upwardly-extending aperture or notch 54 is formed in the lower surface of the skirt portion 37 in line with the opening 36 to receive the upper ends of the thermostat adjusting screw 20 and the U-shaped bracket 22. In addition, there is an enlarged undercut portion 55 (see Figs. 2 and 3) in the lower surface of the skirt 37 to receive and permit the movement of a mounting bracket 56 for the control knob 24, as hereinafter described.

The thermostat 10 comprises a supporting structure 12 which, in this instance, is a flat plate having a threaded bushing 42 attached thereto for receiving the threaded adjusting screw 20. Said threaded bushing 42 is preferably attached to the supporting structure 12 at the midpoint thereof. However, it is to be understood that this bushing may be mounted at any other suitable point. An upwardly-extending stop member or portion 50 is attached to or is made as an integral part of the bushing 42 to limit the rotative movements of the adjusting screw 20 and bracket 22, as hereinafter described. A spring 51 is positioned about the upper part of the threaded portion of screw 20 to act as a restraining cushion therefor, in a well-known manner. A stationary contact 38 which cooperates with a movable contact 39 is insulatedly attached to the supporting structure 12 in a well-known manner, and a suitable electric terminal or strap 41 is connected electrically to the stationary contact 38. A second electric terminal 43, which is located diametrically opposite to the stationary contact 38, is electrically connected to the contact-carrying member 18 by a rivet 40. This rivet 40 also insulatedly and rigidly mounts the resilient supporting member 16, and one end of the resilient contact-carrying member 18, to the supporting structure 12.

The resilient member 16 is relatively small and is, as previously mentioned, rigidly and insulatedly attached at one end thereof to the supporting structure 12 by the rivet 40. The bimetallic element 14 is, in this instance, an elongated strip type element which is mounted intermediate the contact-carrying member 18 and the supporting structure 12 and has its right-hand, relatively stationary end rigidly attached to the free end of the resilient member 16 by means of a rivet 44. In addition, an upwardly offset finger-like member 46 extends intermediate the bimetallic element 14 and the supporting structure 12 and is also rigidly attached to the relatively stationary end of the bimetallic element 14 and the movable end of the resilient member 16 by the rivet 44.

The finger member 46 has an upwardly positioned ledge or offset portion 49 disposed substantially in line with the adjusting screw 20. An insulating member 47 is centrally positioned within an upwardly-extending recess 21 at the lower end of said adjusting screw 20 and bears against the offset portion 49.

The resilient contact-carrying member 18 is rigidly mounted at one end by the rivet 40 to the supporting structure 12, substantially in line with the stationary end of the resilient member 16, and the movable contact 39 is rigidly attached to its free or movable end. The member 18 is arranged in such a manner that it biases the movable contact 39 upwardly to engage the stationary contact 38. An upwardly-extending protuberance or boss 48 is formed in the member 18 below the movable end of the bimetallic element 14, so that as the bimetallic element flexes, it will engage the boss 48 and move the member 18 in response to the flexing action of the bimetallic element.

Accordingly, it is obvious that as the operator turns the control knob 24, the adjusting screw position is changed and the insulating member 47 bearing against the finger 46 will cause the finger and bimetallic element 14 to move together as the resilient member 16 is flexed or biased about the rivet 40. The bimetallic element is so positioned that as it increases in temperature, it will flex downwardly or in counterclockwise direction. The free end of the bimetallic element will then engage the boss 48 in the member 18, causing the cooperating contacts 38 and 39 to become disengaged. Although the bimetallic element 14 does not carry any current, a potential is imposed thereon due to its engagement with the resilient member 16 mounted on the rivet 40. The finger 46 being in contact with the bimetallic element also has a potential imposed thereon. However, the insulating member 47 in the adjusting screw 20 prevents said screw from becoming energized.

Since the contact-carrying member 18 is electrically associated with movable contact 39 and the rivet 40, which in turn are electrically associated with the terminals 41 and 43, it follows that the flow of current through the thermostat will be substantially as follows: From terminal 41 to the stationary contact 38, through movable contact 39, the member 18, rivet 40 and out the second terminal structure 43. Accordingly, it is obvious that the member 18 will tend to increase in temperature in response to the flow of current therethrough, it being understood that the rate of increase in temperature will be in direct ratio with the quantity of current squared and resistance of the contact-carrying member 18.

The adjusting screw 20 embodies, in this instance, an elongated member having its lower end threaded so as to engage the threaded bushing 42 and is of such length as to just pass above the cover plate 34 when the thermostat 10 is mounted upon the soleplate 30 thereof.

The U-shaped bracket 22 is, in this instance, an elongated channel shaped member and is spot-welded to the side of the adjusting screw 20 along its longitudinal axis. An upwardly-projecting portion 23 is offset from the adjusting screw 20 at the upper end of the bracket 22. In addition, an offset depending portion 25 is located at the lower end of bracket 22 which extends downwardly and is adapted to engage the upwardly-extending stop portion 50 as the adjusting screw 20 and bracket 22 are rotated, to limit the rotative movements of the adjusting screw 20.

The adjusting knob 24 comprises a member which fits about the end of the skirt portion 37 and is connected to the adjusting screw 20 and bracket 22 and is retained in juxtaposition with the end of the skirt 37 by a J-shaped bracket 56.

The J-shaped bracket 56 comprises an elongated member having a keyhole-shaped aperture 57 located at one end and a raised portion 58 at the other end thereof. The upper or raised portion 58 of the J-shaped bracket 56 receives the control knob 24 and is rigidly attached thereto by means of a screw 60. The J-shaped bracket 56 and control knob 24 thus move as a unit. The lower part of the J-shaped bracket 56 is positioned within the notch 55 in skirt 37 and is free to rotate therein; also, the keyhole-shaped aperture 57 loosely engages the upper end portion 23 of the U-shaped bracket 22 and fits over the upper end of screw 20 (as shown in Fig. 3). The bracket 56 and knob 24 thus are retained in assembled position but are free to rotate about the adjusting screw 20 as an axis, as the forward end of control knob 24 is rotated in an arc along the front edge of the skirt 52 in response to the movement of an operator's hand.

The upper end portion 23 of bracket 22 fitting within the keyhole-shaped aperture 57 in the J-shaped bracket 56 is also rotated as the knob 24 and bracket 56 are rotated. Inasmuch as the bracket 22 is rigidly attached to the adjusting screw 20, it follows that screw 20 is also rotated as knob 24 is moved.

The control knob 24 and attached J-shaped bracket 56 are assembled to the thermostatic structure when assembling the sadiron structure 26, substantially as follows:

When assembling the iron structure 26, the thermostatic structure 10 is rigidly attached to the soleplate 30 by screws 62, with the adjusting screw 20 substantially normal to the soleplate 30. The handle 28 is positioned upon the cover plate 34, before the cover plate is applied to the soleplate, with the notch 54 in skirt 37 positioned above the opening 36 in cover plate 34. The rear end 31 of handle 28 is then rigidly attached to the cover plate, by screws (not shown). The front end of the handle 28 is then rigidly attached to the cover plate 34 by the front member 33. The control knob 24, attached to the J-shaped bracket 56, is then positioned upon the cover plate, with the portion of the bracket 56 which has aperture 57 therein disposed intermediate the cover plate 34 and the lower surface of the skirt 37 of handle 28. The composite structure, including the attached cover plate 34, handle 28 and the control knob 24 with the attached J-shaped bracket 56, is then positioned upon the soleplate 30. As the cover plate is placed in position, the adjusting screw 20 and upper portion 23 of the U-shaped bracket 22 will pass through the keyhole-shaped aperture 57 in bracket 56. The cover plate 34 is then rigidly attached to the soleplate by screws (not shown).

It follows that, due to the cooperation of adjusting screw 20 and bracket 22 in aperture 57, the control knob 24 and J-shaped bracket 56 cannot become disengaged as long as the iron remains assembled. In addition, due to the cooperation of notched aperture 57 in the J-shaped bracket 56 with the bracket 22 as the control knob 24 is rotated by an operator, the J-shaped bracket 56 rotates the adjusting screw 20 through the U-shaped bracket 22. The lower end of adjusting screw 20, through the insulating pin 47, thus is forced down upon the finger 46 so as to change the angular position of the bimetallic element 14 with respect to the supporting structure 12. It will be noted further that when the free end of the bimetallic element 14 is not in contact with the member 18, the angular position of the bimetallic element 14 with respect to the contact-carrying member is also changed. This action of the control knob 24, through the adjusting screw 20, thus changes the operating limits of the thermostat 10, selectively varying the operation thereof, in accordance with well-known principles.

When the iron is connected to a power supply (not shown), current will pass through contact-carrying member 18, increasing the temperature thereof, which adds heat to the bimetallic element 14, in addition to that of the soleplate. The increasing temperatures of the soleplate and the contact-carrying member 18 cause an increase in the temperature of the bimetallic element 14, such element then flexing downwardly or in counterclockwise direction. The free or movable end of the bimetallic element 14 thus engages the boss 48 of member 18, moving such member downwardly and disengaging the cooperating contacts 38 and 39. The flow of current through the heating element 32 is thus interrupted, permitting the soleplate and contact-carrying member 18 to decrease in temperature, whereupon the element 14 will return to its normal upper position, permitting the contacts 38 and 39 to be re-engaged in a well-known manner.

As the control knob 24 is rotated to move the adjusting screw 20 and the insulating pin 47 downwardly, the distance between the pin 47 and the member 18 is decreased, so that less flexing of the bimetallic element 14 is required to open the contacts. Accordingly, the temperature above which the contacts are open and below which they are closed is reduced, so that the iron is caused to operate at a lower temperature. When the control knob 24 is rotated to raise the adjusting screw 20 and the insulating pin 47, the distance between the pin 47 and the arm 18 is increased. Increased bowing or flexing of the the bimetallic element 14 is now required to open the contacts. Thus, the temperature above which the contacts are opened and below which they are closed, is raised, and the iron is caused to operate at a higher temperature.

Various modifications may be made in the device embodying my invention without departing from the spirit and scope thereof, and I desire, therefore, that only such limitations shall be placed thereon as are imposed by the prior art and the appended claims.

What I claim is:

1. In a thermostat, the combination of a support, a stationary contact mounted on said support, a resilient contact-carrying member rigidly mounted on said support at one end thereof and carrying at its other end a movable contact which cooperates with said stationary contact, said contact-carrying member being self-biased to resiliently hold the cooperating contacts in engagement, a bimetallic element responsive to temperature for actuating the contact-carrying member, said bimetallic element being disposed intermediate the mountings for the stationary contact and the contact-carrying member and between the support and the contact-carrying member, an offset finger member associated with the bimetallic element and disposed intermediate the support and said bimetallic element, a resilient member disposed between the support and the contact-carrying member and attached to the mounting of the latter, one end of said bimetallic element and one end of the finger member being rigidly attached to each other and to one end of the resilient member, said bimetallic element and said finger member being so positioned that upon an increase in temperature the bimetallic element bows away from the finger member to actuate the contact-carrying member in an opening direction, an adjusting screw carried by said support and disposed between the mountings for the stationary contact and the contact-carrying member, said adjusting screw constituting an adjustable stop for the finger member to limit movement away from said contact-carrying member and to selectively vary the angular position of the fixed end of the bimetallic element and thereby vary the deflection of the bimetallic element required to open the cooperating contacts.

2. In a thermostat, the combination of a support, a stationary contact rigidly mounted on said support and insulated therefrom and electrically connected to a first terminal, a resilient contact-carrying member rigidly mounted on said support and insulated therefrom and electrically connected to a second terminal at one end thereof and carrying at its other end a movable contact which cooperates with said stationary contact, said contact-carrying member being self-biased to resiliently hold the movable contact in engagement with the stationary contact and to generate heat, due to current flowing therethrough, when the cooperating contacts are engaged, a bimetallic element responsive to temperature for actuating the contact-carrying member, said bimetallic element being disposed intermediate the mountings for the stationary contact and contact-carrying member and between the support and the contact-carrying member, an offset finger member associated with the bimetallic element and disposed intermediate the support and said bimetallic element, a resilient member disposed between said support and said contact-carrying member and attached to the mounting of the latter, one end of said bimetallic element and one end of the finger member being rigidly attached to each other and to one end of the resilient member, said bimetallic element and said finger member being so positioned that upon an increase in temperature the bimetallic element bows away from the finger member to actuate the contact-carrying member in an opening direction, a threaded bushing attached to said support and disposed between the mountings for the stationary contact and the contact-carrying member, an adjusting screw mounted in said bushing, said adjusting screw constituting an adjustable stop for the finger member to limit movement away from the contact-carrying member and being insulated therefrom and to selectively vary the angular position of the fixed end of the bimetallic element and thereby vary the deflection of the bimetallic element required to open the cooperating contacts, and said bimetallic element being responsive to both the temperature of the surrounding medium and to the temperature of the contact-carrying member.

EARL K. CLARK.

REFERENCES CITED

The following references are of record in the file of this patent:

UNITED STATES PATENTS

| Number | Name | Date |
|---|---|---|
| 2,331,202 | Lee | Oct. 5, 1943 |
| 2,020,538 | Denison | Nov. 12, 1935 |
| 2,267,387 | Winborne | Dec. 23, 1941 |
| 2,287,787 | Dickey | June 30, 1942 |
| 2,298,928 | Clark | Oct. 13, 1942 |